United States Patent [19]
Kull et al.

[11] Patent Number: 4,509,480
[45] Date of Patent: Apr. 9, 1985

[54] SAFETY ARRANGEMENT FOR AN INTERNAL COMBUSTION ENGINE

[75] Inventors: Hermann Kull, Stuttgart; Wolf Wessel, Oberriexingen; Gerhard Stumpp, Stuttgart, all of Fed. Rep. of Germany

[73] Assignee: Robert Bosch GmbH, Stuttgart, Fed. Rep. of Germany

[21] Appl. No.: 571,475

[22] Filed: Jan. 17, 1984

[30] Foreign Application Priority Data

Jan. 20, 1983 [DE] Fed. Rep. of Germany ....... 3301743

[51] Int. Cl.³ .............................................. F02D 31/00
[52] U.S. Cl. ................... 123/359; 123/198 D; 123/198 DB; 123/479
[58] Field of Search ........ 123/359, 357, 358, 198 DB, 123/198 D, 479

[56] References Cited
U.S. PATENT DOCUMENTS 3,699,935 10/1972 Adler et al. ........................ 123/359
3,713,427 1/1973 Adler ................................... 123/357
4,428,341 1/1984 Hassler et al. ..................... 123/359

FOREIGN PATENT DOCUMENTS 2335440 1/1975 Fed. Rep. of Germany ...... 123/198 DB
16231 1/1982 Japan .................................. 123/479

Primary Examiner—Magdalen Y. C. Moy
Attorney, Agent, or Firm—Walter Ottesen

[57] ABSTRACT

The invention is directed to a safety arrangement for an internal combustion engine with self-ignition such as a diesel engine or the like wherein the operational signals of throttle position, rack travel and rotational speed are continuously monitored and compared with upper and lower limit values for these signals. From this comparison, comparison signals are generated and are combined with each other to provide an overall monitoring of the operation of the diesel engine so that the latter can be shut off when impermissible ranges of operation are present or, if conditions permit, the engine can be switched to an emergency mode of operation so that the motor vehicle may be driven to the next service station for repair.

6 Claims, 2 Drawing Figures

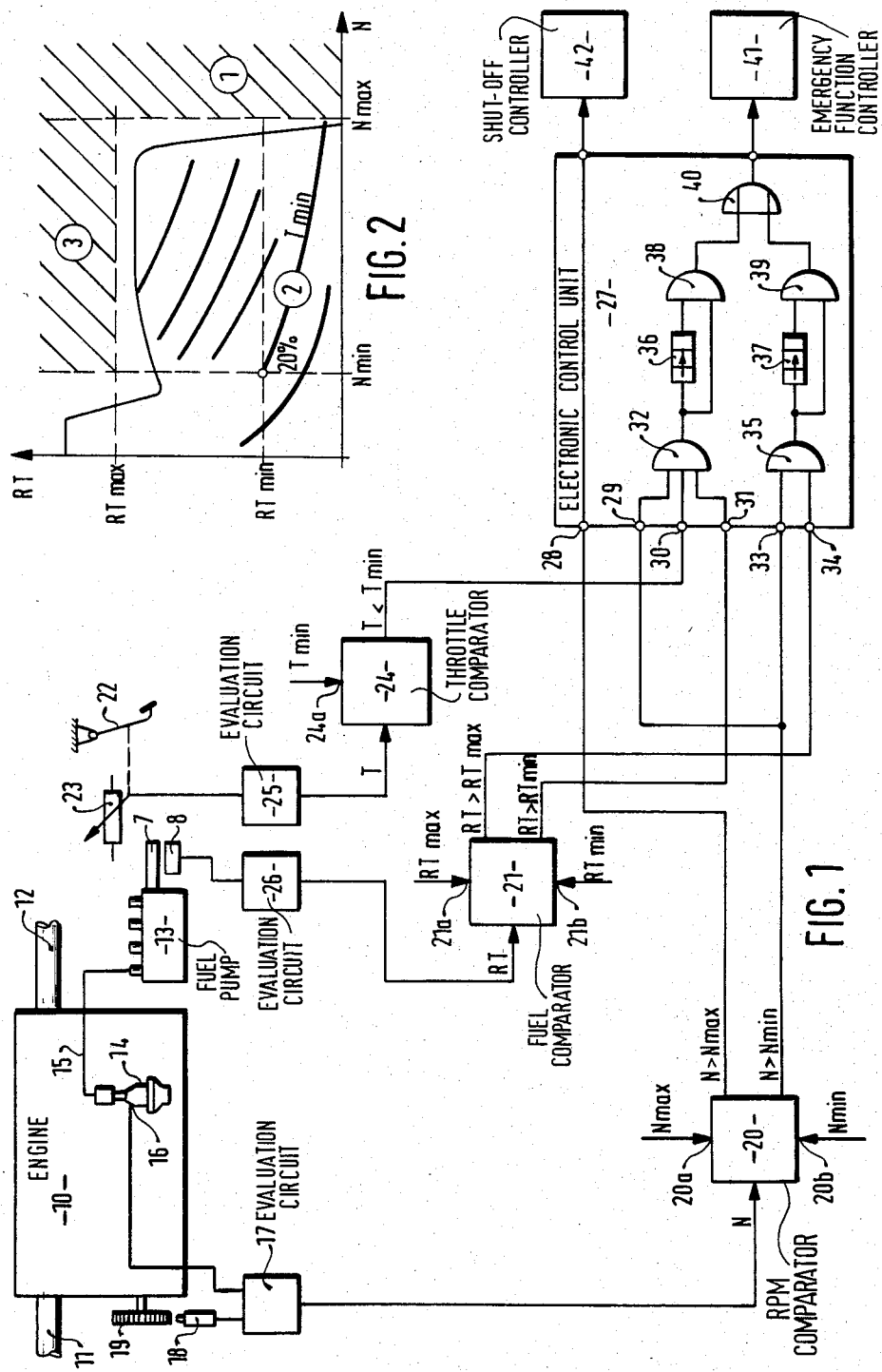

4,509,480

SAFETY ARRANGEMENT FOR AN INTERNAL COMBUSTION ENGINE

BACKGROUND OF THE INVENTION

It is known to use electrical actuators for electronically regulating the operation of a self-igniting internal combustion engine such as a diesel engine. The actuators are controlled by electric signals and are connected to a central electronic control unit. Such arrangements have been substituted for mechanical fuel measuring and control systems of diesel motors which can be seen as reliable with respect to failure; however, such mechanical systems become less and less able to fulfill the many different operational conditions required and become less able to take account of environmental influences.

On the other hand, the utilization of electronic components in combination with electronic diesel regulation (EDC) make overall safety and monitoring measures necessary even when individual component groups provide the possibility of recognizing operational failures.

SUMMARY OF THE INVENTION

In view of the foregoing, it is an object of the invention to provide a safety arrangement for an electronically regulated internal combustion engine such as a diesel engine or the like wherein an overall monitoring of the engine during operation is obtained. It is a further object of the invention to provide such a safety arrangement which detects permissible and impermissible operating conditions with the aid of suitable signals and which, according to the nature of the failure, either causes the diesel engine to be shut off or permits an emergency operation of the motor vehicle in which the diesel engine is the power plant.

The safety arrangement of the invention is suited to a self-igniting internal combustion engine such as a diesel engine or the like for a motor vehicle which includes throttle means and fuel injection means for injecting fuel into the engine. The safety arrangement includes a first sensor for providing an electrical signal N indicative of the rotational speed (rpm) of the engine; a second sensor for providing an electrical signal RT indicative of the quantity of fuel injected; and, a third sensor for providing an electrical signal T indicative of the position of the throttle means. An rpm comparator monitors the rpm signal and compares the same to a lower limit value $N_{min}$ and an upper limit value $N_{max}$ and generates a signal indicative of the comparison. A fuel comparator monitors the fuel-quantity signal and compares the same to the lower limit value $RT_{min}$ and a higher limit value $RT_{max}$ and generates a signal indicative of the comparison. A throttle comparator monitors the throttle position signal and compares the same to a lower limit value $T_{min}$ and likewise generates a signal of the comparison. An electronic control unit has an input side connected to each of the above-mentioned comparators and processes the comparison signals thereof and provides respective control signals in dependence upon and as required by conditions in the engine as evaluated from the output signals of the respective comparators.

Pursuant to a further feature of the invention, the safety arrangement can include a first controller connected to the output side of the electronic control unit for receiving one of the control signals to shut off the engine, and a second controller is connected to the output side of the electronic control unit for receiving another one of the control signals to effect an emergency operation of the engine thereby permitting the motor vehicle to remain operational.

With the above safety arrangement according to the invention, an overall monitoring system for a diesel engine provided with EDC equipment is achieved which reacts to failures occurring during the operation of the diesel motor. The safety arrangement decisively reduces the possible effects of several failures which under circumstances can occur simultaneously in the individual component groups and thereby achieves a safety concept for the operation of the diesel engine.

The above-mentioned throttle sensor can be a sensor mounted with respect to the accelerator or throttle pedal and the fuel-quantity sensor can be a sensor arranged so as to provide an indication of rack travel and can be characterized as a rack travel sensor. In this connection, it is noted that the movable control rod of a fuel-injecting pump can have a rack gear formed thereon for operatively engaging the fuel pump pistons to adjust the quantity of injected fuel. The travel of this rack is therefore indicative of the quantity of fuel injected. The rotational speed sensor monitors the rotational speed of the engine.

As indicated above, electrical signals delivered by the above sensors are continuously monitored and compared with upper and lower limit values of these signals. The corresponding comparison results combined provide a definition of permissible and impermissible regions of operation of the internal combustion engine.

In an advantageous manner, redundant signals can be used in lieu of and as representative of the above-mentioned signals. These redundant signals occur during the operation of the engine, for example, in lieu of the rpm signal, an ancillary signal of an injection-begin sensor can be utilized as a signal indicative of the rotational speed of the engine.

BRIEF DESCRIPTION OF THE DRAWING

The invention will now be described with reference to the drawing wherein:

FIG. 1 is a schematic representation of an internal combustion engine and the safety arrangement associated therewith in the form of a block diagram; and, FIG. 2 is a graphical representation of the rack travel plotted against rpm with the throttle-pedal position as a parameter.

DESCRIPTION OF THE PREFERRED EMBODIMENTS OF THE INVENTION

The basic concept of the overall monitoring system of an electronic diesel control (EDC) arrangement for the regulated electronic operation of a diesel motor includes the detection of certain signals occurring during operation and the comparison thereof with limit values. Such signals include a throttle-pedal signal T, a signal for the rack travel RT which can also be defined as a duration of injection signal (SD) or an injection-quantity signal and, a rotational speed (rpm) signal N.

Also, redundant signals can be detected which can be used in lieu of the above-mentioned signals which occur in suitable areas of the internal combustion engine. The throttle-pedal signal T, the rack-travel signal RT, and the rpm signal N are compared to the following five boundary or limit values:

throttle-pedal minimum signal ($T_{min}$)

rack travel minimum signal ($RT_{min}$)
rack travel maximum signal ($RT_{max}$)
rpm minimum signal ($N_{min}$)
rpm maximum signal ($N_{max}$)

In the ideal situation, it is also possible that these five limit signals can be delivered by redundant sensors. For example, a stop in the form of a contact sensor can be arranged with respect to the throttle pedal and generate the throttle-pedal minimum signal $T_{min}$ when the pedal reaches a predetermined minimum position along the excursion path through which it is moved.

Referring now to FIG. 1, the internal combustion engine is designated by reference numeral 10 and is provided with an air induction tube 11 and an exhaust gas tube 12. A fuel pump 13 is connected to an injection valve 14 via a pressure conduit 15. The injection valve 14 can include an injection-begin sensor 16 which can deliver an injection-begin signal referenced to rpm; this signal can be directed to a sensor signal evaluation circuit 17 via data path 9 and utilized as an rpm signal.

Also, an rpm sensor 18 can be provided which detects the rpm of the internal combustion engine via a spur gear 19 driven by the crankshaft of the engine. The output of the rpm sensor 18 can be connected to the sensor signal evaluation circuit 17.

At this point, attention is called to the fact that the manner in which signals are obtained for the safety monitoring system is only exemplary and this is especially the case with respect to the comparator circuits having upper and lower limit values for these signals. It is especially noted that the signal processing which will be explained below can also have a form other than the explicit arrangement of components shown in the drawing and can, for example, be conducted with the aid of central logic circuits or microcomputers incorporating microprocessors or the like.

The rpm signal N is applied to an rpm comparison circuit 20 to which is also applied the limit value for the maximum rpm $N_{max}$ as indicated at reference numeral 20a and a predetermined limit value for the minimum rpm $N_{min}$ as indicated by reference numeral 20b. These limit values are set as required by the safety monitoring system. The limit values can be provided by separate limit-value generating circuits as, for example, potentiometers.

As mentioned, the position of the movable control rod of a fuel-injection pump is indicative of the quantity of injected fuel. Accordingly, the signal indicative of the quantity of fuel injected can be determined from a sensor 8 detecting the position of the control rod 7 of the fuel pump 13. This signal is identified as the rack-travel signal RT and is connected to a comparator circuit 21 to which limit values of maximum rack travel $RT_{max}$ and minimum rack travel $RT_{min}$ are supplied as indicated by reference numeral 21a and 21b, respectively. In a similar manner, a potentiometer 23 can provide a position signal T indicative of the throttle-pedal position. The potentiometer 23 is moved by a mechanical connection to the throttle pedal 22.

A sensor signal evaluation circuit 25 can be placed in the electrical circuit connecting the potentiometer 23 to the throttle-pedal comparator circuit 24 and a sensor signal evaluation circuit 26 can be placed in the circuit between the sensor 8 measuring the rack travel and the comparator circuit 21. A signal for the minimum throttle-pedal position $T_{min}$ is applied to the comparator 24 and is indicated by reference numeral 24a. The sensor signal evaluation circuits 17, 25 and 26 of FIG. 1 change the signals generated by the sensors into signals needed by the comparators to which they are connected, respectively. Accordingly, these circuit blocks include circuit components such as filters, analog-to-digital converters, amplifiers and the like in various configurations as may be required.

The individual comparator circuits 20, 21, and 24 are so configured that they generate comparison signals at their outputs when the operating signals applied thereto for rpm, rack travel and throttle position exceed or drop below the predetermined limit values. In this manner, the following five comparator signals are provided: $N>N_{max}$, $N>N_{min}$, $RT>RT_{min}$, $RT>RT_{max}$, and $T<T_{min}$. These signals are utilized by the safety arrangement according to the invention as will be described below.

These five comparison values at the outputs of the comparator circuits 20, 21, and 24 are indicative of permissible and impermissible operating ranges for the engine and are processed in such a manner that the impermissible ranges which require safety measures are indicated when the following conditions are fulfilled, namely:

(1) $N>N_{max}$
(2) $N>N_{min}$ and $T<T_{min}$ and $RT>RT_{min}$
(3) $N>N_{min}$ and $RT>RT_{max}$ If condition (1) is present, then the motor is directly shut off. Conditions (2) and (3) still permit a desired emergency operation of the engine depending upon the configuration of the follow-on switching circuits. Such an emergency operation can, for example, be a controlled operation. Of course, the occurrence of conditions (2) and (3) can lead to an evaluation, in dependence upon the corresponding basic safety concept, as to whether or not the motor should be shut off.

The electronic control unit 27 is suited for detecting and processing the five comparison signals to the above-mentioned three conditions. In this connection, it is noted that the arrangement shown in FIG. 1 for the electronic control unit 27 is a preferred embodiment; however, a great many other processing circuit configurations can be utilized without departing from the spirit of the invention.

At input 28 of the electronic control unit 27, the comparison signal $N>N_{max}$ is applied which is at the same time the failure condition (1). To detect the combined failure condition (2), the comparison signal $N>N_{min}$ is applied to the input 29 of unit 27; at input 30, the comparison signal $T<T_{min}$ is applied; and, to input 31 the comparison signal $RT>RT_{min}$ is applied. All three signals are combined together via an AND-Gate 32 in such a manner that an impermissible operating condition is present if, at the same time, the rotational speed is above a lower minimum rpm value $N_{min}$ while the throttle pedal position has dropped below the minimal limit value $T_{min}$ but, on the other hand, the rack travel is at a value above the rack-travel minimum limit value $RT_{min}$. The operating condition in which the internal combustion engine operates in this situation does not correspond to the will of the driver of the motor vehicle as manifested by the position which he imparts to the throttle pedal.

The failure condition (3) occurs when the comparator signal $N>N_{min}$ is applied to the input 33 and $RT>RT_{max}$ is applied at input 34 of the electronic control unit 27. These signals are combined at an AND-Gate 35 which is connected to the inputs 33 and 34 as shown. This failure condition too signals an impermissible operating condition since the injected fuel quantity is greater than the fuel quantity should be during normal operation ($RT > RT_{max}$). It is only during starting of the engine that the injected quantity of fuel is greater than that injected during normal operation; however, in this engine starting condition, the rotational speed is below the rpm minimum value $N_{min}$ (see FIG. 2).

Delay stages 36, 37 are connected in cascade with and forward of the AND-Gates 32 and 35, respectively, to insure that for the predetermined time period T which can, for example, be 150 ms, the respective sets of input signals from the comparators corresponding to conditions (2) and (3) will show the impermissible operational conditions and therefore blank out dynamic transients. Failure condition signals reach the emergency function block 41 via respective further AND-Gates 38, 39 and after passing through OR-Gate 40. The emergency function block 41 can, for example, make possible an emergency use of the vehicle by reducing the quantity of fuel injected or other suitable measure. The first signal representing the failure condition (1) applied to the input 28 of the electronic control unit 27 is connected directly to a shut-off block 42 which shuts the motor off since, under all circumstances, it must be prevented that the rotational speed of the diesel engine exceeds a predetermined rpm value.

The above-mentioned failure conditions (1) to (3) are shown in the diagram of FIG. 2. The diagram shows that an impermissible operating range identified by numeral 3 is always present when the predetermined injected quantity of fuel is exceeded, that is, when the predetermined rack-travel maximum $RT_{max}$ is exceeded. This condition is only then not present when the rotational speed is below the lower limit value $N_{min}$ which is the case during the starting operation of the diesel engine at which time there is always an especially large quantity of injected fuel available.

The failure condition (1) corresponding to the situation wherein the rotational speed exceeds $N_{max}$ is self-explanatory from the diagram; whereas, if the position of the throttle pedal drops below the predetermined minimal position $T_{min}$ which, in the illustrated embodiment, can be beneath twenty percent (20%) of the excursion path of the pedal, there is likewise an impermissible region of operation if, at the same time, the rotational speed exceeds the minimum rotational speed $N_{min}$ and the injected quantity of fuel exceeds the rack travel minimum $RT_{min}$.

As indicated in the disclosure, the term "rack travel" is representative of terms such as metered fuel, load of the internal combustion engine, or quantity of fuel delivered and all mean the same, namely: the amount of fuel which the internal combustion engine has consumed to this point in time. The term rack travel therefore corresponds to a specific fuel-quantity signal and can be replaced with other suitable fuel-quantity signals. Accordingly, the term should not be viewed as being limited.

It is understood that the foregoing description is that of the preferred embodiments of the invention and that various changes and modifications may be made thereto without departing from the spirit and scope of the invention as defined in the appended claims.

What is claimed is:

1. A safety arrangement for a self-igniting internal combustion engine such as a diesel engine or the like for a motor vehicle wherein the engine includes: throttle means and fuel injection means for injecting fuel into the engine; the safety arrangement comprising:

first sensor means for providing an electrical signal N indicative of the rotational speed (rpm) of the engine;

second sensor means for providing an electrical signal RT indicative of the quantity of fuel injected;

third sensor means for providing an electrical signal T indicative of the position of said throttle means;

rpm comparator means for monitoring said rpm signal N and comparing the same to a lower limit value $N_{min}$ and an upper limit value $N_{max}$ thereof and generating a signal indicative of the comparison;

fuel comparator means for monitoring said fuel-quantity signal RT and comparing the same to a lower limit value $RT_{min}$ and a higher limit value $RT_{max}$ thereof and generating a signal indicative of the comparison;

throttle comparator means for monitoring said throttle means position signal T and comparing the same to a lower limit value $T_{min}$ and generating a signal indicative of the comparison; and, an electronic control unit having an input side connected to each of said rpm comparator means, said fuel comparator means and said throttle comparator means for processing the outputs thereof and providing respective control signals in dependence upon and as required by conditions in the engine as evaluated from said outputs of said respective comparator means.

2. The safety arrangement of claim 1 further comprising:

first controller means connected to the output side of said electronic control unit for receiving one of said control signals, when transmitted, to shut off the engine; and, second controller means connected to the output side of said electronic control unit for receiving another one of said control signals, when transmitted, to effect an emergency operation of said engine thereby permitting the motor vehicle to remain operational.

3. A safety arrangement for a self-igniting internal combustion engine such as a diesel engine or the like for a motor vehicle wherein the engine includes: throttle means and fuel injection means for injecting fuel into the cylinders of the engine; the safety arrangement comprising:

first sensor means for providing an electrical signal N indicative of the rotational speed (rpm) of the engine;

second sensor means for providing an electrical signal RT indicative of the quantity of fuel injected;

third sensor means for providing an electrical signal T indicative of the position of said throttle means;

rpm comparator means for comparing said rpm signal N to an upper limit $N_{max}$ thereof to generate a first rpm comparison signal when $N > N_{max}$ and, for comparing said rpm signal N to a lower limit $N_{min}$ thereof to generate a second rpm comparison signal when $N > N_{min}$;

fuel comparator means for comparing said fuel-quantity signal RT to an upper limit $RT_{max}$ thereof to generate a first fuel comparison signal when $RT > RT_{max}$ and, for comparing said signal RT to a lower limit $RT_{min}$ to generate a second fuel comparison signal when $RT > RT_{min}$;

throttle comparator means for comparing said throttle position signal T to a lower limit $T_{min}$ thereof to generate a throttle comparison signal when $T<T_{min}$;

an electronic control unit having an input side connected to each of said rpm comparator means, said fuel comparator means and said throttle comparator means for processing the outputs thereof and providing control signals in dependence upon and as required by conditions in the engine as evaluated from said outputs of said respective comparator means; said electronic control unit including:

first circuit means for receiving said first rpm comparison signal to define a first failure condition corresponding to $N>N_{max}$;

second circuit means for receiving said second rpm comparison signal, said throttle comparison signal and said second fuel comparison signal and combining the same to define a second failure condition corresponding to $N>N_{min}$, $T<T_{min}$ and $RT>RT_{min}$; and, third circuit means for receiving said second rpm comparison signal and said first fuel comparison signal and combining the same to define a third failure condition corresponding to $N>N_{min}$ and $RT>RT_{max}$.

4. The safety arrangement of claim 3, said first sensor means including: an rpm sensor arranged with respect to the crankshaft of the engine to provide a signal indicative of the rotational speed thereof and a sensor signal evaluation circuit connected between said rpm sensor and said rpm comparator means; said second sensor means including: a position sensor arranged with respect to the regulating rod of the fuel pump to provide a signal indicative of the position thereof and a sensor signal evaluation circuit connected between said position sensor and said fuel comparator means; said third sensor means including: a throttle position sensor to provide a signal indicative of the position of the throttle pedal and a sensor signal evaluation circuit connected between said throttle position sensor and said throttle comparator means; said first circuit means being configured so as to cause one of said control signals to correspond to said first failure condition; and, said electronic control unit further including ancillary circuit means connected to said second circuit means and said third circuit means for generating a signal indicative of said second and said third failure conditions, said last-mentioned signal corresponding to another one of said control signals.

5. The safety arrangement of claim 3, said second circuit means being one AND-Gate and said third circuit means being another AND-Gate; said electronic control unit further including two delay stages connected to the outputs of said AND-Gates, respectively, whereby short term instabilities such as dynamic transients are blanked out thereby permitting output signals to appear at the outputs of said delay stages corresponding to said second and third failure conditions, respectively; two AND-Gates connected to said outputs of said delay stages, respectively; and an OR-Gate connected to the outputs of said last-mentioned AND-Gates, the output of said OR-Gate corresponding to one of said control signals.

6. The safety arrangement of claim 5 comprising controller means connected to the output of said OR-Gate for receiving said one control signal and for effecting an emergency operation of said engine thereby permitting the motor vehicle to remain operational.

* * * * *